United States Patent [19]

Haydock et al.

[11] Patent Number: 4,749,579

[45] Date of Patent: Jun. 7, 1988

[54] PROCESS FOR PRODUCING LOW FAT CONTENT POTATO CHIPS

[75] Inventors: Steve Haydock, St-Célestin; Monique Marchand, Warwick, both of Canada

[73] Assignee: Les Croustilles Yum Yum Inc., Warwick, Canada

[21] Appl. No.: 28,407

[22] Filed: Mar. 20, 1987

[30] Foreign Application Priority Data

Mar. 26, 1986 [CA] Canada ................................. 505185

[51] Int. Cl.⁴ .............................................. A23L 1/217
[52] U.S. Cl. ................................... 426/242; 426/441; 426/637; 426/804
[58] Field of Search ............... 426/241, 242, 438, 441, 426/637, 243, 804, 808

[56] References Cited

U.S. PATENT DOCUMENTS

| | | | |
|---|---|---|---|
| 3,353,962 | 11/1967 | Smith | 426/438 X |
| 3,410,702 | 11/1968 | Frank | 426/637 |
| 3,594,188 | 7/1971 | Huxsoll et al. | 426/241 |
| 3,682,643 | 8/1972 | Foster | 426/243 X |
| 3,881,028 | 4/1975 | Capossela et al. | 426/441 X |
| 4,254,153 | 3/1981 | Ross et al. | 426/637 X |
| 4,272,554 | 6/1981 | Schroeder et al. | 426/321 |
| 4,283,425 | 8/1981 | Yuan et al. | 426/102 |
| 4,537,786 | 8/1985 | Bernard | 426/438 |

FOREIGN PATENT DOCUMENTS

| | | | |
|---|---|---|---|
| 1151945 | 8/1983 | Canada | 99/174 |
| 2921936 | 12/1980 | Fed. Rep. of Germany | 426/243 |

OTHER PUBLICATIONS

Chipper/Snacker "Borden Turns on the Lite", Jan. 1983, pp. 48–52.

Primary Examiner—Arthur L. Corbin
Attorney, Agent, or Firm—Robic, Robic & Associates

[57] ABSTRACT

A process for producing salted potato chips having a fat content lower than 32% by weight. The process comprises the steps of preparing potato slices, washing the slices in an aqueous solution of sodium chloride to salt the same in depth, drying the salted slices, preheating the dry slices with infrared radiations, and frying the preheated slices by immersion in a bath of edible oil or fat heated at an appropriate frying temperature.

14 Claims, No Drawings

PROCESS FOR PRODUCING LOW FAT CONTENT POTATO CHIPS

BACKGROUND OF THE INVENTION

1. Field of the Invention

The invention relates to a process for producing potato chips which have a reduced content of edible oil or fat (e.g. lower than 32% by weight) and are salted in depth.

The invention also relates to the chips obtained by this process.

2. Brief Description of the Prior Art

The various processes known to the Applicant for producing "regular" potato chips comprise the following basic steps:
(a) peeling of potatoes;
(b) inspecting and rejecting the potatoes having inappropriate qualities;
(c) slicing the potatoes;
(d) washing the potato slices;
(e) drying the potato slices (usually by blowing ambient air by means of a fan);
(f) frying the potato slices by immersion in an edible oil or fat heated at an appropriate temperature (usually in a hydrogenated canola oil heated at about 385° F., for about 150 seconds).
(g) salting the surfaces of the potato chips so obtained (usually by sprinkling salt thereon);
(h) inspecting and rejecting the so obtained potato chips having inappropriate qualities, and, if desired,
(i) flavoring the potato chips with cheese or any other ingredient.

Potato chips called "regular" usually have a fat content of about 36 to 42% by weight. Uptaking of this oil or fat occurs during the frying step where the chips are immersed in an edible oil or fat heated at a temperature appropriate for such frying.

Numerous attempts have been made up to now to reduce and eventually eliminate the oil or fat content in potato chips so as to satisfy an increasing request from consumers toward this type of chips.

Thus, by way of example, U.S. Pat. No. 4,537,786 describes a process where potato slices are fried in an oil or fat heated at a temperature varying from 280° F. to 320° F. The slices are removed from the oil or fat when their moisture content is of about 3 to 15% by weight, and then brought into contact for about 1 to 10 minutes, with an air stream whose temperature is of about 250° to 300° F., until the moisture content of these slices is reduced to about 2% by weight.

U.S. Pat. No. 4,238,425 describes a process for producing chips having a fat content that may reach 10%. These chips are prepared by coating potato slices with globular proteins, eventually applying a layer of edible oil at the surface of the protein coating, and then heating said coated slices in a micro-wave oven.

Canadian Pat. No. 1,151,945 describes a process for producing chips having a low calorie content, by coating potato slices with a layer of an edible oil and then heating and frying them, in a single step, in a microwave oven. The oil uptake of the chips obtained by this process is lower than 20% by weight.

All of these processes for producing potato chips with a low content of oil or fat necessitate either important modifications to the standard equipment used for this purpose, or the installation of a new equipment specific to the production of chips having a low fat or oil content (commonly called "light chips"), which involve in most cases important investment costs.

OBJECTS OF THE INVENTION

An object of the present invention is to provide a process for producing salted potato chips having a low fat content, which process overcomes all of the aforesaid drawbacks.

Another object of the invention is to provide a process of the above mentioned type, which can be carried out in an installation designed for producing "regular" chips, without having to significantly modify this installation. Thus, it is possible to switch, if desired, from one type of production to the other.

A further object of the invention is to provide "light" potato chips which are salted in depth and have a fat content lower than 32% by weight.

SUMMARY OF THE INVENTION

The process according to the invention for producing salted potato chips having a fat content lower than 32% by weight, is characterized in that it comprises the steps of:
(a) preparing potato slices;
(b) washing these potato slices in an aqueous solution of sodium chloride to salt the same in depth;
(c) drying the salted potato slices;
(d) preheating the dry potato slices with infrared radiations; and
(e) frying the dry and preheated potato slices by immersion in a bath of edible oil or fat heated at an appropriate temperature to fry the same.

DETAILED DESCRIPTION OF THE INVENTION

The drying and preheating steps (c) and (d) of the process according to the invention can be carried out simultaneously. Alternatively, steps (c) and (d) can be carried out in sequence.

Advantageously, drying step (c) can be carried out with ambient air.

The potato slices used as "starting material" preferably have a thickness ranging between 0.050 and 0.070 inch and preferably of about 0.060 inch. It is known that the thicker the slices are, the lower is their oil or fat content. A thickness of 0.060 inch is preferred for its organoleptic qualities.

Advantageously, the potatoes used in the process according to the invention are picked up from batches where potatoes have a specific weight greater or equal to 1.070. These potatoes may be those identified under the cultivar Superior or Kennebec.

The aqueous solution of sodium chloride used in step (b) may contain from 1 to 10% (w/w), preferably about 4% (w/w), of sodium chloride. Provided that the water comes from a public utility supply, washing step (b) can be carried out at the temperature at which water is supplied.

Advantageously, the potato slices are put in contact with the aqueous solution of sodium chloride for a period of time ranging between 30 to 60 seconds. The temperature of the solution may vary between about 40° F. and 80° F., preferably between 50° and 70° F.

During the washing step carried out in an aqueous solution of sodium chloride an osmosis takes place, whereby part of the water contained in the slices is withdrawn and replaced by salted water. Due to such a withdrawal of part of the water contained in the potato slices, less water is to be eliminated from these slices during the subsequent steps. Of course, it is advantageous to use an aqueous solution of sodium chloride of such a concentration that potato slices immediately contain the appropriate amount of NaCl, thereby avoiding any further addition of NaCl at the end of the process.

The washing and salting step (b) can be carried out in a washer of any conventional type like those used for producing "regular chips", except that water is replaced by an aqueous solution of NaCl. The washer may comprise means for measuring and maintaining the salt content of the washing-salting solution, and means for draining, if desired, part of this washing-salting solution, the portion of solution eliminated being replaced by an equivalent portion of fresh salted solution.

Preferably, ambient air is blown onto the potato slices by means of at least one fan. The infrared radiations directed against potato slices, may be generated by an infrared radiator positioned at a short distance of, for example 2 inches, a conveyor where the potato slices are moved, so as to preheat these slices and withdraw from about 5 to about 7% (w/w) of their water content. Preferably, the infrared radiations may be generated by six infrared radiators like those sold under the Trademark Eclipse Bescom (Model 67 IR (double)) positioned side by side at about 2 inches above the conveyor where the potato slices are moving, each radiator developing 420 000 BTU.

Advantageously, the edible oil is heated (namely in a fryer provided with a thermostat) between about 370° to 390° F. Preferably, the slices are fried by immersion in an edible oil (namely hydrogenated canola oil) heated at 385° F. for about 120 seconds.

The elimination of a part of the water originally contained in the potato slices while the same are simultaneously salted in depth and washed by means of an aqueous solution of sodium chloride, and then either simultaneously dried and preheated by means of infrared radiations, or simultaneously dried and preheated by means of ambient air and infrared radiations or successively dried by means of ambient air and dried and preheated by means of infrared radiations. permits to reduce (especially of about 20%) the frying time in the edible oil heated at an appropriate temperature. This reduction of the frying time reduces the amount of oil absorbed by the potato slices. Furthermore, preheating of potato slices minimizes the drop of temperature of the oil contained in the fryer. This leads in turn to a reduction of the energy required for heating and maintaining the edible oil at a temperature varying from about 370° to 390° F.

According to a preferred embodiment of the invention, chips containing from 26 to 32% (w/w) of fat and from 1.6 to 2.2% (w/w) of salt distributed in dept in them are produced as follows: potato slices of about 0.060 inch thick are simultaneously salted in depth and washed in an aqueous solution containing about 4% (w/w) of NaCl. Such a washing is carried out for about 30 to 60 seconds at a temperature ranging between 40° and 80° F. Then, the slices are simultaneously dried and preheated with infrared radiations generated by infrared radiators positioned near and above(i.e. 2 inches) a conveyor on which the potato slices are moved. Then, the slices are fried by immersion in a bath of edible oil or fat. Such a frying may be carried out for a period of time of about 120 seconds. As edible oil, use is preferably made of hydrogenated canola oil heated at 385° F.

The invention is of course concerned with the product per se (i.e. potato chips containing from 26 to 32% (w/w) of fat and from 1.6 to 2.2% (w/w) of salt distributed in the depth in them) whenever these chips are obtained by the process described hereinabove. The chips that are so obtained also differ from the "regular chips" in that they are crispier and have a reduced fat taste, a lower bulk density (for example 3.0 lbs/ft$^3$ instead of 3.8 lbs/ft$^3$). In addition they are more curved.

It is assumed that the significant reduction in the oil or fat content of the potato slices (e.g. uptake lower than 32% (w/w)) is due to the combination of the above mentioned washing and salting step with the above drying-preheating step. In fact, as shown in the following examples, carrying out one of these steps only does not yield the aimed result.

The following examples illustrate the invention without limiting it:

EXAMPLE 1

Process for producing regular chips

Potatoes of the Kennebec variety, having a specific weight of 1.075 were peeled and cut in slices of 0.060 inch, washed with cold water (i.e. water at the temperature delivered by the utility water supplied). They were dried with fans while being conveyed from the washing zone to a frying zone. They were then fried in a hydrogenated canola oil heated at a temperature of 385° F. To do so, use was made of a fryer SALVO* model M-320 having a capacity of 3.200 lbs/hour. The oil absorption of the chips that were so prepared was of 38.2% (w/w).
*(Trade mark)

EXAMPLE 2

Process for producing chips, including the additional step of drying and preheating the potato slices with infrared radiations.

Potatoes picked up from the same batch as those used in example 1 and having a specific weight of 1.075, were peeled and cut in slices of 0.060 inch. They were washed with cold water and dried under fans. Then, they were submitted to a drying-preheating step carried out with infrared radiations generated by infrared radiators. These radiators were of the type sold under the trademark Eclipse Bescom (model 67 IR (double)). The radiators were positioned near and above a conveyor where the potato slices were moved from their washing zone toward a fryer. Preheating lasted about 6 seconds. Then the slices were fried in canola oil at a temperature of 385° F. The fryer was of the same type than the one used in example 1. The oil absorption of the chips was of 35.6% (w/w). This corresponds to a reduction of 6.8% as compared to regular chips.

EXAMPLE 3

Process for preparing chips, including the additional step of washing and salting the slices with an aqueous solution of sodium chloride Potatoes picked up from the same batch than the one used in example 1, and having a specific weight of 1.075, were peeled, cut in sliced of 0.060 inch, and washed in a brine containing 4% (w/w) of salt (NaCl) before being dried under fans during their displacement on a conveyor from their washing zone and the fryer. The latter was of the same type as the one used in example 1. The dried slices were fried in canola oil at 385° F. The oil absorption of the chips was of 33.1%. This corresponds to a reduction of 13.4% as compared to regular chips.

EXAMPLE 4

Process for preparing chips, including the additional steps of washing and salting the potato slices with an aqueous solution of sodium chloride, and of drying and preheating the potato slices with infrared radiations (process according to the invention)

Potatoes picked up from the same batch as those used in example 1 and having a specific weight of 1.075, were peeled, cut in slices of 0,060 inch, and washed in a brine containing 4% (w/w) of salt (NaCl). Then, the slices were dried and preheated during six seconds with infrared radiations generated by a set of infrared radiators Eclipse Bescom* (model 67 IR (double)) positioned near and above a conveyor where potato slices were moved from their washing zone to a fryer. In this fryer, they were fried in canola oil heated at a temperature of 385° F. The fryer was of the same type as the one used in example 1. The oil absorption of the chips that were so prepared was of 28.4% (w/w). This corresponds to a reduction of 25.7% as compared to regular chips.
*(Trade mark)

It should be noted that the combination of above-mentioned steps leads to a reduction in the absorption of oil or fat, that is greater than the sum of the reductions obtained in examples 2 and 3.

What is claimed is:

1. A process for producing potato chips salted in depth and having a fat content lower than 32% by weight, said process comprising the steps of:
    (a) preparing potato slices;
    (b) washing said potato slices in an aqueous solution of sodium chloride to salt said slices in depth by osmosis;
    (c) drying the salted potato slices;
    (d) preheating the dried potato slices with infrared radiations; and
    (e) frying the preheated potato slices by immersion in a bath of an edible oil or fat heated at an appropriate temperature to fry the same.

2. The process of claim 1, wherein the drying step (c) and preheating step (d) are carried out simultaneously.

3. The process of claim 2, wherein steps (c) and (d) are carried out by blowing ambient air onto the potato slices by means of at least one fan and by directing toward said potato slices infrared radiations from at least one infrared radiator positioned near a conveyor on which said potato slices are moved, said preheating being carried out in such a manner as to withdraw from about 5 to 7% by weight of water from the potato slices.

4. The process of claim 1, wherein the drying step (c) and the preheating step (d) are carried out successively.

5. The process of claim 4, wherein the drying step (c) is carried out with ambient air.

6. The process of claim 1, wherein the potato slices have a thickness ranging between 0.050 and 0.070 inch.

7. The process of claim 6, wherein the potato slices have a thickness of about 0.060 inch.

8. The process of claim 1, wherein the potato slices are prepared from potatoes having a specific weight greater or equal to 1.070.

9. The process of claim 1, wherein, in step (b), the aqueous solution of sodium chloride contains from 1 to 10% by weight of sodium chloride.

10. The process of claim 9, wherein, in step (b), the aqueous solution of sodium chloride contains about 4% by weight of sodium chloride.

11. The process of claim 1, wherein, in step (b), the potato slices are brought in contact with the aqueous solution of sodium chloride for a period of time ranging between 30 and 60 seconds, said aqueous solution being at a temperature between 40° and 80° F.

12. The process of claim 1, wherein, in step (e), the bath of edible oil or fat is heated at a temperature ranging between 370° and 390° F.

13. The process of claim 1, wherein, in step (e), the bath of edible oil or fat is heated at a temperature of about 385° F. and the immersion is carried out for a period of time of about 120 seconds.

14. A process for preparing potato chips containing from 26 to 32% by weight of fat and from 1.6 to 2.2% by weight of salt distributed in depth in said chips, comprising the steps of:
    (a) preparing potato slices having a thickness of about 0.060 inch;
    (b) simultaneously salting in depth by osmosis and washing said slices by means of an aqueous solution containing about 4% by weight of sodium chloride, during a period of about 30 to 60 seconds at a temperature ranging between 40° to 80° F.;
    (c) simultaneously drying and preheating the salted slices with ambient air blown onto the chips by means of at least one fan and by means of infrared radiations generated by at least one infrared radiator positioned near and above a conveyor on which the potato slices are moving, and
    (d) frying the dried preheated chips by immersion in a bath of an edible oil or fat heated at about 385° F., said frying step being carried out from about 120 seconds.

* * * * *